US012689684B2

(12) United States Patent
Land

(10) Patent No.: US 12,689,684 B2
(45) Date of Patent: Jul. 21, 2026

(54) ENQUEUING ASYNCHRONOUS TASKS

(71) Applicant: DISCORD INC., San Francisco, CA (US)

(72) Inventor: Ebrahim Land, San Francisco, CA (US)

(73) Assignee: DISCORD INC., San Francisco, CA (US)

( * ) Notice: Subject to any disclaimer, the term of this patent is extended or adjusted under 35 U.S.C. 154(b) by 102 days.

(21) Appl. No.: 18/298,937

(22) Filed: Apr. 11, 2023

(65) Prior Publication Data

US 2024/0348699 A1 Oct. 17, 2024

(51) Int. Cl.
*H04L 67/55* (2022.01)
*H04L 47/56* (2022.01)
*G06F 9/48* (2006.01)

(52) U.S. Cl.
CPC .............. *H04L 67/55* (2022.05); *H04L 47/56* (2013.01); *G06F 9/4881* (2013.01)

(58) Field of Classification Search
CPC ... H04L 12/1877; H04L 47/245; H04L 49/90; H04L 51/226; H04L 67/12; H04L 67/568; H04L 67/1008; H04L 12/66; H04L 51/214; H04L 67/1095; G06Q 10/107; G06Q 50/01; G06F 9/542; G06F 11/1443; G06F 11/3006; G06F 9/548; G06F 9/4812; G06F 9/546; G06F 9/4881; H04W 4/50; H04W 72/20; H04N 21/4788; G06N 5/04
See application file for complete search history.

(56) References Cited

U.S. PATENT DOCUMENTS

| | | | | |
|---|---|---|---|---|
| 7,945,813 B1 * | 5/2011 | Watson | ............... | G06F 11/1443 714/17 |
| 9,509,529 B1 * | 11/2016 | McAllister | ............ | H04L 51/226 |
| 10,361,985 B1 * | 7/2019 | Shveykin | .............. | H04L 67/568 |
| 10,908,977 B1 * | 2/2021 | Ferstay | ............... | G06F 11/3006 |
| 2004/0158831 A1 * | 8/2004 | Amano | ................. | G06F 9/4812 718/100 |
| 2004/0250060 A1 * | 12/2004 | Diep | ........................ | G06F 9/548 713/155 |
| 2005/0262205 A1 * | 11/2005 | Nikolov | ............... | G06Q 10/107 709/206 |
| 2007/0038569 A1 * | 2/2007 | Hickson | .................. | H04L 49/90 705/50 |
| 2008/0196039 A1 * | 8/2008 | Garrard | ................. | H04L 47/245 719/314 |

(Continued)

*Primary Examiner* — Dustin Nguyen

(74) *Attorney, Agent, or Firm* — POLSINELLI PC // (DC OFFICE)

(57) ABSTRACT

The present technology provides an asynchronous task messaging service for a server that supports near real-time communications. The asynchronous task service, as a cloud-based message-oriented middleware, sends messages associated with the tasks back to the community hosting service. A delay is encoded in the task code of the message that sets a delay mechanism that is custom to the task and task code. The tasks sent to the asynchronous task service includes tasks that only need to be executed within a reasonable amount of time (i.e., within a couple of days), tasks that need to be executed as soon as possible but does not make sense after a certain amount of time, and tasks that need to execute with as much effort as is reasonable to happen exactly once.

20 Claims, 6 Drawing Sheets

(56) References Cited

U.S. PATENT DOCUMENTS

| | | | | |
|---|---|---|---|---|
| 2010/0269164 A1* | 10/2010 | Sosnosky | ........... | H04L 67/1095 |
| | | | | 707/E17.007 |
| 2012/0059882 A1* | 3/2012 | Stark | ....................... | H04L 12/66 |
| | | | | 709/205 |
| 2013/0304826 A1* | 11/2013 | Li | ........................ | H04L 51/214 |
| | | | | 709/206 |
| 2014/0180788 A1* | 6/2014 | George | ................. | G06Q 50/01 |
| | | | | 705/14.72 |
| 2015/0271546 A1* | 9/2015 | Kim | ................... | H04N 21/4788 |
| | | | | 725/109 |
| 2015/0381709 A1* | 12/2015 | Word | ..................... | H04L 49/90 |
| | | | | 709/203 |
| 2019/0058772 A1* | 2/2019 | Ruiz-Meraz | ........ | H04L 67/1008 |
| 2020/0059376 A1* | 2/2020 | Slovetskiy | ......... | H04L 12/1877 |
| 2020/0264922 A1* | 8/2020 | Kamiya | ................ | G06F 9/4881 |
| 2020/0394532 A1* | 12/2020 | Kau | ........................ | G06N 5/04 |
| 2021/0298033 A1* | 9/2021 | Nishiyama | ............ | H04W 72/20 |
| 2022/0345536 A1* | 10/2022 | Takla | ..................... | H04W 4/50 |
| 2023/0123232 A1* | 4/2023 | Methvin | ................ | H04L 67/12 |
| | | | | 370/413 |
| 2023/0142108 A1* | 5/2023 | Iyer | ........................ | G06F 9/542 |
| | | | | 719/314 |
| 2023/0289214 A1* | 9/2023 | Tang | ..................... | G06F 9/546 |

* cited by examiner

Pushing a first task message from a first publisher of a server that supports near real-time communications to a first topic of a middleware asynchronous messaging server, wherein the first topic includes a message queue and places the first task message in the message queue, and wherein the first task message is pushed to a first subscription when the first task message is dequeued
402

Pushing a second task message from a second publisher to the first topic, wherein the first publisher and the second publisher have different rollout schedules
404

Receiving the first task message at a subscriber worker associated with the first publisher
406

Setting a delay mechanism before performing a task described in the first task message
408

FIG. 4

ENQUEUING ASYNCHRONOUS TASKS

BACKGROUND

Some social networks are developed around friendships, professional relationships, or other individual connections, and some social networks create communities around topics. Often social networking platforms provide services through which users can form or interact within a social network. Users can generally post comments or other content, make connections, add links, or simply browse content created by others. Some social networks have moderators that moderate the content in their respective social networks or online communities. While social networks can provide entertainment, networking, commercial, or informational value, they are also subject to various challenges. Social networking platforms, like other technology platforms, may use asynchronous tasks to perform various processes. Blocking web requests to perform long-running tasks synchronously is prohibitive and thus necessitates a queueing system to execute tasks asynchronously.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIG. 4 illustrates an example flowchart diagram for enqueuing asynchronous tasks by the asynchronous task service in accordance with some aspects of the present technology.

DETAILED DESCRIPTION

Figure 1:
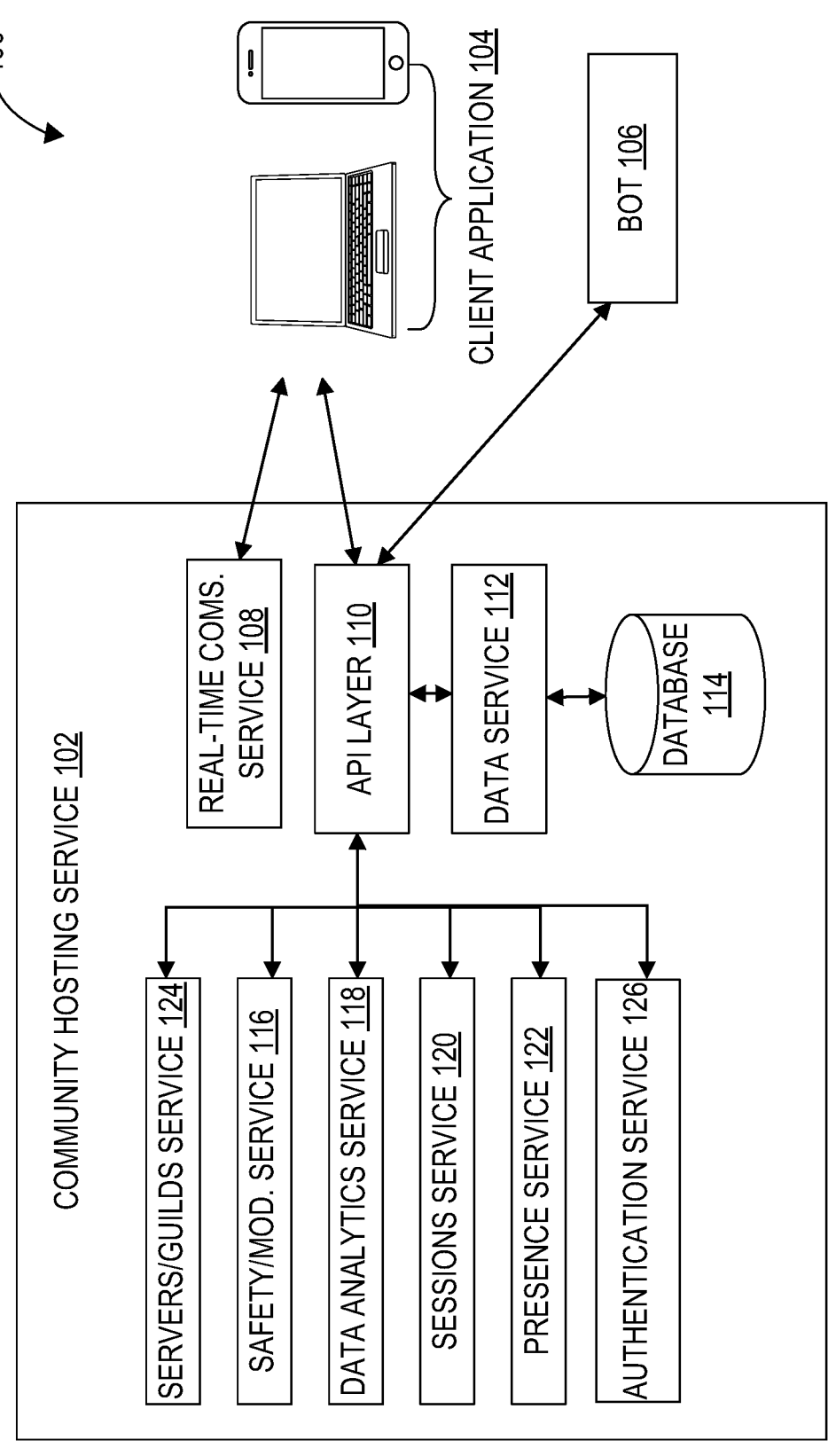
FIG. 1 illustrates an example system that is configured to support user accounts in creating, managing, and participating in online communities in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for an asynchronous task messaging service for a server that supports near real-time communications. There may be a lot of different asynchronous tasks that need to be executed, but they may require different service levels and certain performance characteristics. Various tasks and features of the community hosting service may inevitably fail. However, depending on the crucialness of the tasks, some tasks cannot be lost, and, in some cases, a dead-letter queue may be used to catch tasks which have failed for too long (i.e., 7 days), even after several retries. In some cases, some tasks should retry occasionally, for example, using exponential backoff, until the tasks are completed, although after a long time (e.g., 7 days) if the tasks are lost, they are not retried. Other tasks may be a best-effort and may be retried for a period of time, e.g., for 15 minutes, and then just be dropped from the queue/topic.

Previous task handling services may be based on distributed message passing and support scheduling. Some issues with previous task handling services may be associated with a lack of robustness leading to dropped asynchronous tasks. The disclosed technology includes an asynchronous service that dissociates services that produce messages from services that process those messages. In doing so, the asynchronous task service may be a messaging-oriented middleware that provides a queue to parallelize tasks.

More specifically, for a server that supports near real-time communications, there may be different priority levels of tasks. Some tasks may be low priority tasks that, as long as they are performed, timing is not important. For example, sending a confirmation email that a subscription has been cancelled may be done within a couple of days. Other tasks may need to be executed as soon as possible but if they do not successfully complete after a certain period of time, then they do not need to be performed. For example, embedding rendered information for a link when the link is typed in a message should be executed as soon as possible. Therefore, these different types of tasks with different priority and workflows may need to be treated differently.

The server that supports near real-time communications may perform various asynchronous tasks with the support of a customizable asynchronous task service by using custom libraries associated with custom workflows for different priority levels and types of tasks. More specifically, the customizable asynchronous task service may create systems of event producers and consumers, called publishers and subscribers. Publishers communicate with subscribers asynchronously by a publisher-subscriber relationship where subscribers are explicitly subscribing to particular topics and only those subscribers are given the messages that go into the topic.

Publishers send messages pertaining to events to the asynchronous task service, without regard to the details of how or when these messages are to be processed. The asynchronous task service then delivers messages to all the services or topics that react to them. A topic may be a type of queue that can receive messages that belong to the topic. A service may be a logical entity or collection of entities that are subscribers to messages associated with a topic, and that perform at least a portion of a task associated with the message. The asynchronous task service may provide a generic subscriber worker, such that custom DevOps setup of the topics and subscribers as well as the publishing code help customize and distinguish tasks. The custom DevOps setup of the topics and subscribers may include deciding how many topics, subscriptions, and subscriber workers to have. In some cases, each topic is associated with a corresponding subscription for a team's fire-and-forget tasks along with a subscriber worker that handles the tasks for the subscription. The fire-and-forget tasks allow the continuation of a respective process flow, without waiting for a response. Then, multiple publishers can publish different tasks by sending message to that topic to be handled by the subscriber. Furthermore, in some cases, there may be a simple task publisher that publishes all events to the asynchronous task service.

Although the present disclosure broadly covers the use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

FIG. 1 illustrates an example system 100 configured to support user accounts in creating, managing and participating in online communities. In particular, the system 100 supports a plurality of user accounts interacting with each other in communities to which they belong.

The system 100 illustrates an example architecture in which users of user accounts interact through an instance of client application 104 operating on a computing device. The client application 104 can be provided by a webpage rendered in a web browser or a downloaded client application executed by an operating system of the computing device. In some embodiments, some disparate collections of features or functionality might be available in client application 104 depending on the capabilities of the environment executing or rendering the client application 104.

The system 100 also includes a community hosting service 102, which provides an infrastructure for supporting the plurality of user accounts interacting with each other in communities to which they belong. The community hosting service 102 can be a distributed service hosted in a cloud computing architecture. The community hosting service 102 is responsible for hosting various services accessible to the user accounts by the client application 104.

In some embodiments, the community hosting service 102 provides a servers/guilds service 124 to enable user accounts to set up a server (also referred to as a guild) to host members interacting around one or more channels. A server (or guild) is a user-created environment supporting a community. A server is generally configured with one or more channels which are generally created around topics or subtopics, or groups of people, and can support exchanges of communications between user accounts. Some channels are non-real-time channels where users communicate through written messages, images, emojis, recorded voice or video files, attachments, etc. Some channels are real-time communications channels that support voice or video communications. Some channels may be able to support both non-real-time messaging and real-time communications.

A user account can operate their instance of the client application 104 to create a server at the community hosting service 102. In some embodiments, this will be performed by the client application 104 calling the API layer 110 requesting to create a new server. The API layer 110 can then interact with servers/guilds service 124 to create the server by providing the server with a unique identifier and associating various configurations requested by the user account. Once the server is created, the user account that created the server can be considered the owner and/or admin for the server. The servers/guilds service 124 can record the information about the server using data service 112 to store information about the server in database 114.

In some embodiments, servers can be configured to be public or private. A public server is one that any user can search for and request to join. A private server is one that a user needs to be invited to join. Depending on the configuration of the private server, a user can be invited by another user or may need to be invited by the administrator of the private server. Users can request to join a public or private server, and an entity with administrative privileges can grant the request.

In some embodiments, servers can be managed by the user account that created the server. Additionally, server administrators can delegate privileges to other user accounts to be administrators, and administrators can also create or invite bots 106, such as a chatbot, to perform some administrative actions.

In addition to approving user accounts to join a server, administrators can also set up various safety or content moderation policies. In some embodiments, those policies are enforced by user accounts with the administrator role for the server. In some embodiments, the policies can be enforced by software services provided by the community hosting service 102, such as the Safety/moderation service 116 or bot 106.

As introduced above, servers are environments for supporting a community and are generally created around topics. In furtherance of that function, servers can be configured to integrate content through embedded channels or webhooks. For example, an administrator of a server might integrate a YOUTUBE channel, a TWITCH feed, or a TWITTER feed into one or more channels of the server when the content of those channels or feeds are relevant to the channel. In some embodiments, a server can follow a channel offered by another server supported by the community hosting service 102.

In addition to hosts, user accounts that are members of a server can also use their instance of client application 104 to interact with the community hosting service 102. The client application 104 can make requests of the community hosting service 102 to initiate a session with the community hosting service 102 and to access servers and channels to which the user account is a member, receive notifications and send messages, and otherwise communicate in the channels in which they belong.

As illustrated in FIG. 1, community hosting service 102 provides a variety of services that can be called by client application 104 or other services of the community hosting service 102.

For example, the community hosting service 102 includes a servers/guilds service 124. The servers/guilds service 124, as described above, can be used to create and administer a server. Additionally, the servers/guilds service 124 can also support various functions to those user accounts that are members of a server. For example, when an instance of client application 104 establishes a session using sessions service 120, the sessions service 120 can interact with servers/guilds service 124 to provide information regarding the servers to which the user account belongs. The client application 104 can receive identifiers of all servers to which the user account operating the client device associated with client application 104 is a member. While the session is active, client application 104 can request updates regarding one or more of the servers to which the user account operating the client application 104 belongs from servers/guilds service 124.

Community hosting service 102 also provides a safety/ moderation service 116. As with any online community, community hosting service 102 occasionally needs to deal with user accounts issuing spam or inappropriate content. While administrators of servers can perform some moderation functions such as suspending user accounts on a particular server or banning user accounts or bots for inappropriate posts or for posting spam, community hosting service 102 can have various software services that attempt to moderate some posts. For example, safety/moderation service 116 can include algorithms designed to detect hate speech or other harmful or inappropriate content. Safety/ moderation service 116 can also include algorithms configured to identify communications as spam or phishing. Safety/moderation service 116 can provide various functions to protect users from content posted in a channel and attacks on the client application 104 or the computing device hosting the client application 104.

Community hosting service 102 can also include a data analytics service 118. The data analytics service 118 can provide various services in support of community hosting service 102 and in support of the users of community hosting service 102. For example, data analytics service 118 can monitor the performance of various features of the community hosting service 102 to determine whether updates to features are well received by the user community. The data analytics service 118 can also be used to develop and run various machine learning algorithms and other algorithms designed to identify harmful content, malicious servers, malicious user accounts, and malicious bots 106.

As introduced above, sessions service 120 is configured to authenticate a user account to community hosting service 102. After a user account has been authenticated, the sessions service 120 can determine one or more servers to which the user account is a member or for which the user account is an administrator. The sessions service 120 can send a list of identifiers for the servers associated with the user account to the client application 104. Thereafter, the client application 104 can request information regarding the servers by using a session token that validates that the client application 104 is operating in an authenticated session.

The presence service 122 can be used to provide presence information regarding other members of a server or a channel to which the user account belongs. Through the presence service 122, the client application can convey information about which user accounts are currently active in the server or channel. Likewise, the client application 104 can provide presence information for the user account controlling the instance of client application 104.

Community hosting service 102 can also include a real-time communications service 108. The real-time communications service 108 is configured to support real-time communications such as live voice communications or video conferencing. In some embodiments, the real-time communications service 108 can be a public Internet service located outside a gateway for community hosting service 102. Real-time communications service 108 can provide real-time communications for channels configured to support real-time communications.

Authentication service 126 may assist with receiving authentication (i.e., via OAuth 2) from a third-party application to receive a set of curated data, that is updated over time, pertaining to the third-party application user account. The authentication service 126 serves as a safety measures for the community hosting service 102 when facilitating real-world transactions, especially with regard to authenticating seller user accounts by giving buyer user accounts access to reliable information about the seller as well as restricting certain capabilities to authenticated sellers, as further described below.

FIG. 1 also illustrates a bot 106. The bot 106 can be created and configured by users of the community hosting service 102 and linked to servers chosen by the administrator. In some embodiments, the bot 106 can be configured as a chatbot that can have some understanding of the human language through natural language processing technologies. The bot 106 can be configured to provide some content moderation functions and/or some administrative functions. For example, the bot 106 might be granted permission to invite new members, send messages in a channel, embed links, remove members, delete messages, mute members, and attach files, among other possible functions. In some embodiments, bots 106 can have their own user account and are authenticated using a token. Bots 106 can have full access to all services of community hosting service 102.

While the community hosting service 102 is shown with just one of each service and database, it will be appreciated by those of ordinary skill in the art that community hosting service 102 can include many instances of each service or database, and in some embodiments, there can be different versions of the service or database that may utilize different technologies such as coding languages, database schemes, etc.

In some embodiments, the community hosting service 102 is configured such that the majority of communications between the community hosting service 102 and the client application 104 pass through API layer 110. The client application 104 can request responses from various services provided by the community hosting service 102 from the API layer 110. Additionally, services within the community hosting service 102 can communicate with each other by sending messages through the API layer 110. The client application 104 can also interact with a real-time communications service 108 for voice and video communication services. Although the community hosting service 102 is be described with respect to a particular system architecture and communication flow, it will be appreciated by those of ordinary skill in the art that other system configurations are possible.

Figure 2A:
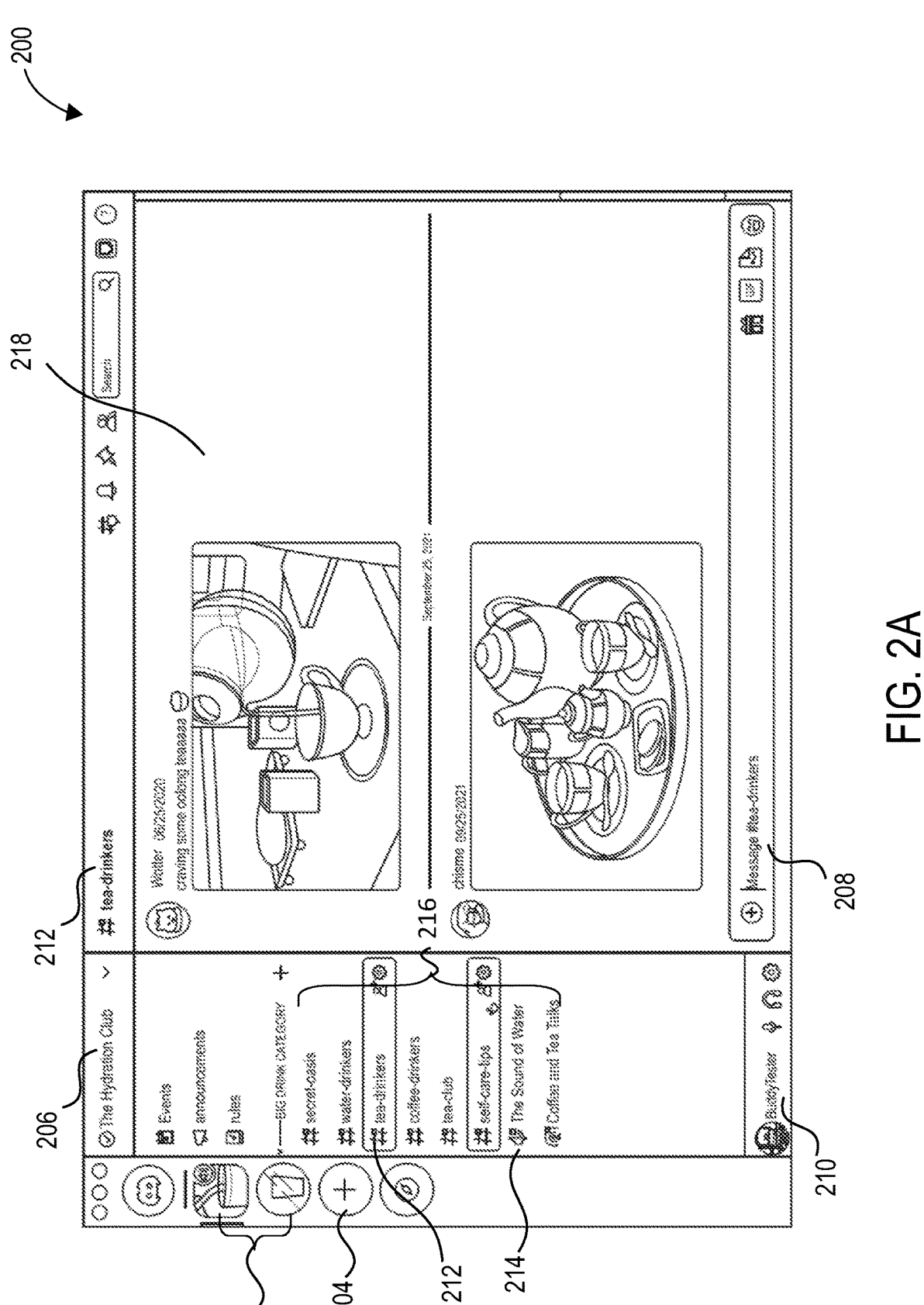
FIG. 2A illustrates an example of a user interface presented by a client application in accordance with some aspects of the present technology.

FIG. 2A illustrates an example of user interface 200 presented by client application 104.

User interface 200 includes icons for servers 202. The top icon has been selected and represents the "hydration club" server. The title 206 of the selected server, the "hydration club," is presented at the top of the user interface 200. User interface 200 also includes a plurality of channels 216 that are part of the server hydration club server. One of the channels, entitled "tea drinkers" 212 is a non-real-time messaging channel. The message thread within the "tea drinkers" channel 214 can be shown within messaging pane 220. As illustrated in FIG. 2A, the messaging pane 218 is configured to present content such as text messages, images, emojis, recorded voice or video files, attachments, etc. A user can provide content to be included in the channel using input interface 208.

User interface 200 also includes a selectable option 204 to add additional servers. User interface 200 also includes a user account icon and controls 210.

Figure 2B:
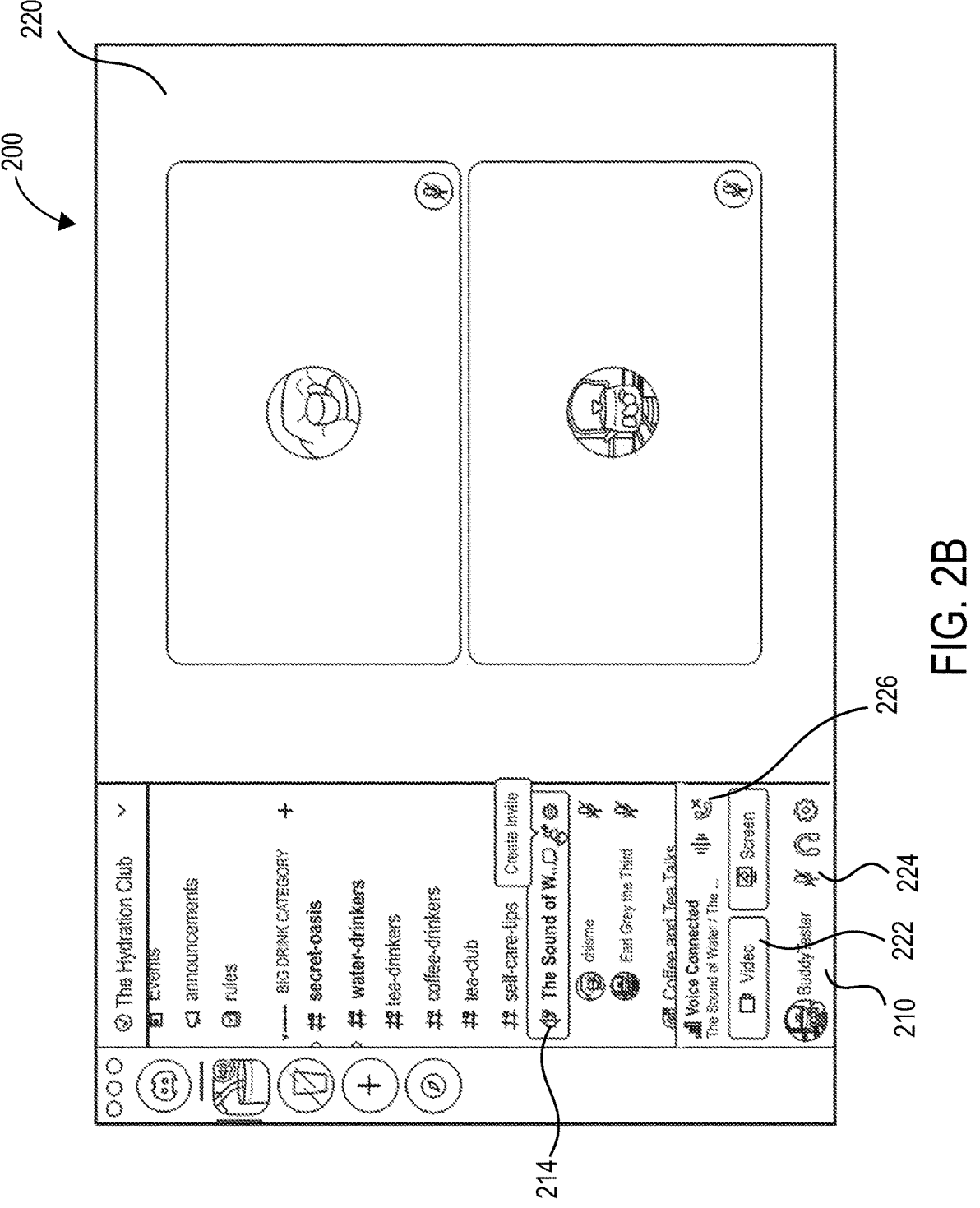
FIG. 2B illustrates an example of a user interface presented by a client application in accordance with some aspects of the present technology.

FIG. 2B illustrates an example of user interface 200 presented by client application 104. In FIG. 2B channel 214 for the channel entitled "sound of water" has been selected. The "sound of water" channel is a real-time communications channel. Accordingly, messaging pane 220 shows two user accounts engaged in real-time communications. As illustrated in FIG. 2B, the user account icon and controls 210 show that the user accounts microphone 224 is muted. Additionally, the user account has options 222 to share their video or screen. The user account can also disconnect from the real-time communications using option 226.

Figure 3:
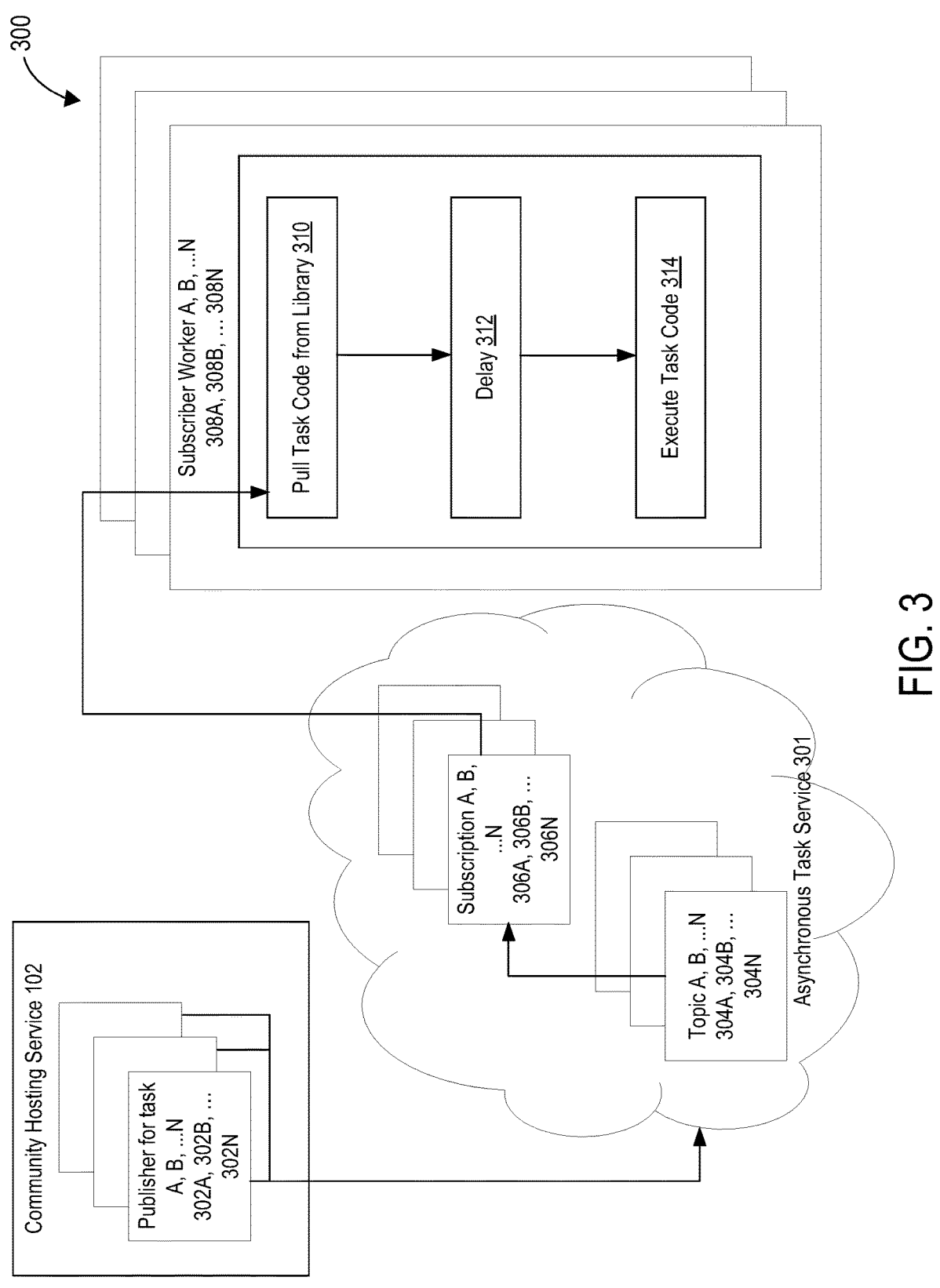
FIG. 3 illustrates an example diagram depicting an example system architecture of an asynchronous task service in accordance with some aspects of the present technology.

FIG. 3 illustrates an example diagram depicting an example system architecture 300 of an asynchronous task service 301 in accordance with some aspects of the present technology.

The community hosting service 102, and/or an API for the community hosting service 102, may include publishers 302A, 302B, . . . 302N that send messages about tasks to the asynchronous task service 301. The asynchronous task service 301 may be a cloud-based message-oriented middleware that sends messages associated with the tasks back to the community hosting service 102. The publishers 302A, 302B . . . 302N may be a subclass of a single publisher. As a middleware layer, the asynchronous task service 301 allows software components (applications, servlets, and other components) that have been developed independently and that run on different networked platforms to interact with one another.

In some embodiments, the present technology can utilize more than one task service. The community hosting service 102 can include logic to determine whether messages go to which service, or the publishers can determine which task goes to which service. For example, the community hosting service may use a feature flag, a percent rollout feature flag, a coinflip, etc. to control whether a message is sent to the asynchronous task service 301 or the open-source task service to the asynchronous task service 301.

The message about a task may describe a function to be performed (and other custom mechanisms) and the message about the task may be sent to a specific topic, associated with a specific task execution schedule, at the asynchronous task service 301 without a need for a formal schema or formal broker. The message may be sent to a specific topic based on a tag indicating that specific topic. The messages about tasks sent to the asynchronous task service 301 may pertain to tasks that only need to be executed within a reasonable amount of time (i.e., within a couple of days), tasks that need to be executed as soon as possible but does not make sense after a certain amount of time, and tasks that need to execute with as much effort as is reasonable to happen exactly once. For example, a stock-keeping unit (SKU) may be canceled and an email notifying that the SKU is canceled may be executed within a reasonable amount of time (i.e., within a couple of days). Embeds for URLs in a message to be sent to the community hosting service 102 for including an attached image may be an example of a that needs to be executed as soon as possible but does not make sense after a certain amount of time. And renewal email reminders are an example of tasks that need to execute with as much effort as is reasonable to happen exactly once.

The publishers 302A, 302B, 302C may send a message about a task to a topic 304A, 304B . . . 304N of the asynchronous task service 301. A topic can be a message queue appropriate for a specific task execution schedule and/or a type of task to which the message about the task pertains. In some cases, the topics may include a default topic and a low priority topic as defaults. There may be more specific topics such as a topic specifically for embeds, which are time sensitive, and therefore it is important that they do not contend with other tasks. There may be new custom topics that are built for the community hosting service 102 for specific performance guarantees and different retry policies. In some cases, the topics may specify that an exactly once mechanism is turned on, whereby the task is executed with as much effort as is reasonable to happen exactly once. For example, the exactly once quality of service parameter may be encoded in the in-code config associated with a function such that the publisher will send the message to the appropriate topic, or the exactly once quality of service parameter can be associated with the instructions tied to the topic to which the message is enqueued.

Once the respective topic 304A, 304B . . . 304N, determined based on the selected topic associated with the message, receives the task, the respective topic 304A, 304B, . . . 304N enqueues the message associated with the task. When the respective topic 304A, 304B . . . 304N causes a respective subscriber 306A, 306B . . . 306N to perform an associated action, the respective subscriber worker 308A, 308B, . . . 308N will either perform a pull request from or receive a push. In some cases, such as for scheduling tasks and reoccurring tasks, a pull request may be utilized. The subscriber worker 308A, 308B, 308N may then pull (310) messages with executable task code from a respective library to execute the respective task associated with the coded function in the message. In some cases, a delay 312 may be coded in the task code that sets a delay mechanism that is custom to the task and task code. The task code may include workflows that handle a number of subtasks that all depend on an initial subtask associated with the task to be first initiated.

For example, tasks with respect to reminders for renewal of subscriptions need to be handled close to when the subscription is going to lapse. In some cases, a recurring task that runs every hour or so may pull the subscriptions that are about to lapse in the next X days. Then, for each of those subscriptions, an async task may be scheduled to handle sending a reminder email to the subscription owner. Essentially, there may be one logical workflow for dealing with each of the various tasks, such as one workflow dealing with a logical subscription lifecycle.

In some cases, a dashboard may be provided and can receive a message associated with a task to generate a graph or analytics associated with the performance of the task. The analytics may include how long the task took, how long the task took to send to the asynchronous task service 301 and how long it took for the asynchronous task service 301 to send back to the community hosting service 102, a number of failures and success, and how many messages are still in the queue.

FIG. 4 illustrates an example flowchart diagram for enqueuing asynchronous tasks by the asynchronous task service in accordance with some aspects of the present technology.

Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method 400 includes pushing a first task message from a first publisher of a server that supports near real-time communications to a first topic of a middleware asynchronous messaging server at block 402. For example, the community hosting service 102 and/or the API layer 110, illustrated in FIGS. 1 and 3, may push the first task message from the first publisher to the first topic of the middleware asynchronous messaging server or asynchronous task service 301. In some cases, the first topic pushes the first task message to a first subscription. The first topic may be a default topic, a low priority topic, or a customized topic, such as an embed topic. In some cases, first topic includes a message queue and places the first task message in the message queue, and the first task message is pushed to a first subscription when the first task message is dequeued. The topics use queue-like semantics. The message queue is not guaranteed by default but can be added as a requirement.

According to some examples, the method 400 includes pushing a second task message from a second publisher to the first topic at block 404. The first publisher and the second publisher may have different task execution schedules with respect to when the tasks are performed at the community hosting service 102. For example, the community hosting service 102 and/or the API layer 110, illustrated in FIGS. 1 and 3, may push the second task message from the second publisher to the first topic. The different task execution schedules may be set as a delay mechanism that is appended to the task message.

According to some examples, the method 400 includes receiving the first task message at a subscriber worker associated with the first publisher, at block 406. For example, the community hosting service 102 and/or the API layer 110, illustrated in FIGS. 1 and 3, may receive the first task message at the subscriber worker associated with the first publisher. In some cases, for each topic there is a corresponding subscription and along with a corresponding subscriber worker that handles the tasks for that subscription. When the corresponding subscriber worker is ready to handle the task, the corresponding subscriber worker may receive a respective API call associated with the task.

For example, in a streaming pull subscription model, the subscriber workers ask for up to k messages at a time and at most k messages will be given at a time to that subscriber worker. A subscriber worker 308 can indicate to the asynchronous task service 301 that it is ready for up to k messages (k is configurable in our aforementioned in-code configs per-topic/subscription pair). The asynchronous task service 301 may give that subscriber worker at most k messages. The subscriber worker 308 may then unwraps each message and locate the task's function name, arguments, and keyword arguments. The subscriber work 308 may then run that function (i.e. runs the task) with those arguments and keyword arguments. If successful, the subscriber worker 308 acknowledges (sending ACKs) the message to the asynchronous task service 301. If there's an error, the subscriber worker 308 does not acknowledge (NACK the message), which the asynchronous task service 301 receives as an intent to retry the message after some backoff period of time.

According to some examples, the method 400 includes setting the delay mechanism before performing a task described in the first task message at block 408. For example, the community hosting service 102 and/or the API layer 110, illustrated in FIGS. 1 and 3, may set the delay mechanism before performing the task described in the first task message. In some cases, the delay message may be a few minutes. The delay mechanism may be sent when a task is published. In some cases, the delay mechanism can vary even with a type of task. For example, a task foobar may be scheduled once with delay_ms=6000 and then again later with delay_ms=1000000.

In some cases, when the subscriber worker 308 receives the task, the subscriber worker 308 reads the message payload at the delay_ms parameter. If the time between task publish time and now is less than X seconds, such as 4 seconds, sleep( ) is executed in the subscriber process for the amount of time needed to respect the requested delay. If it's more than the X seconds, the message does not get acknowledge (NACK the message), which send the message back to the asynchronous task service 310. The exponential backoff of the asynchronous task service 301 retries to try the task again later. This means that delay is a lower bound, not an upper bound i.e. there is a guarantee of a delay of at least X milliseconds, but no guarantees as to the maximum amount of delay.

In some cases, the method 400 may include pushing a third task message from a third publisher of the server that supports near real-time communications to a second topic of the middleware asynchronous messaging server. The second topic may push the third task message to a second subscription, and the second topic may be associated with latency sensitive tasks. In some cases, the third task message may be received at a second subscriber worker associated with the second publisher and the task described in the third task message may be performed in response. For example, the task may be embedding an image associated with a URL in a message. Furthermore, the task may be canceled if the task is not performed in a certain period of time.

In some cases, other types of topics may include billing tasks that need an exactly once semantics or billing tasks that do not need an exactly once semantics For example, for billings tasks that need exactly once semantics, the asynchronous task service 301 is notified that a particular topic would enforce the exactly once semantics. These types of tasks may have their own topic. In some cases, for tasks that are being transferred from another open-source asynchronous messaging server, analogous topics may be created such that one-to-one mapping between topics may keep the same topics and their respective settings intact.

According to some examples, the method 400 includes receiving a request to create a new topic at the middleware asynchronous messaging server. In some cases, topics are created before tasks are scheduled in production and are configured a priori. The new topic may be associated with a project with tasks to be performed at the server that supports near real-time communications. The topic may include custom settings and retry policies for specific tasks that may not be best served if contended with other tasks with different priorities. For example, an exactly-once semantic may be selected for the new topic.

According to some examples, the method 400 includes receiving a request to generate a logical workflow associated with the task, wherein the logical workflow includes subtasks that are triggered by the task. In some cases, the subtasks may require sending a subtask back to the asynchronous task service 301.

According to some examples, the method 400 includes setting a guard associated with the first publisher, wherein the guard limits a percentage of times that tasks sent from the first publisher are sent to the middleware asynchronous messaging server. In some cases, the task message is not limited by the guard and in other cases, the task message is limited and is routed to another open-source asynchronous messaging server.

Figure 5:
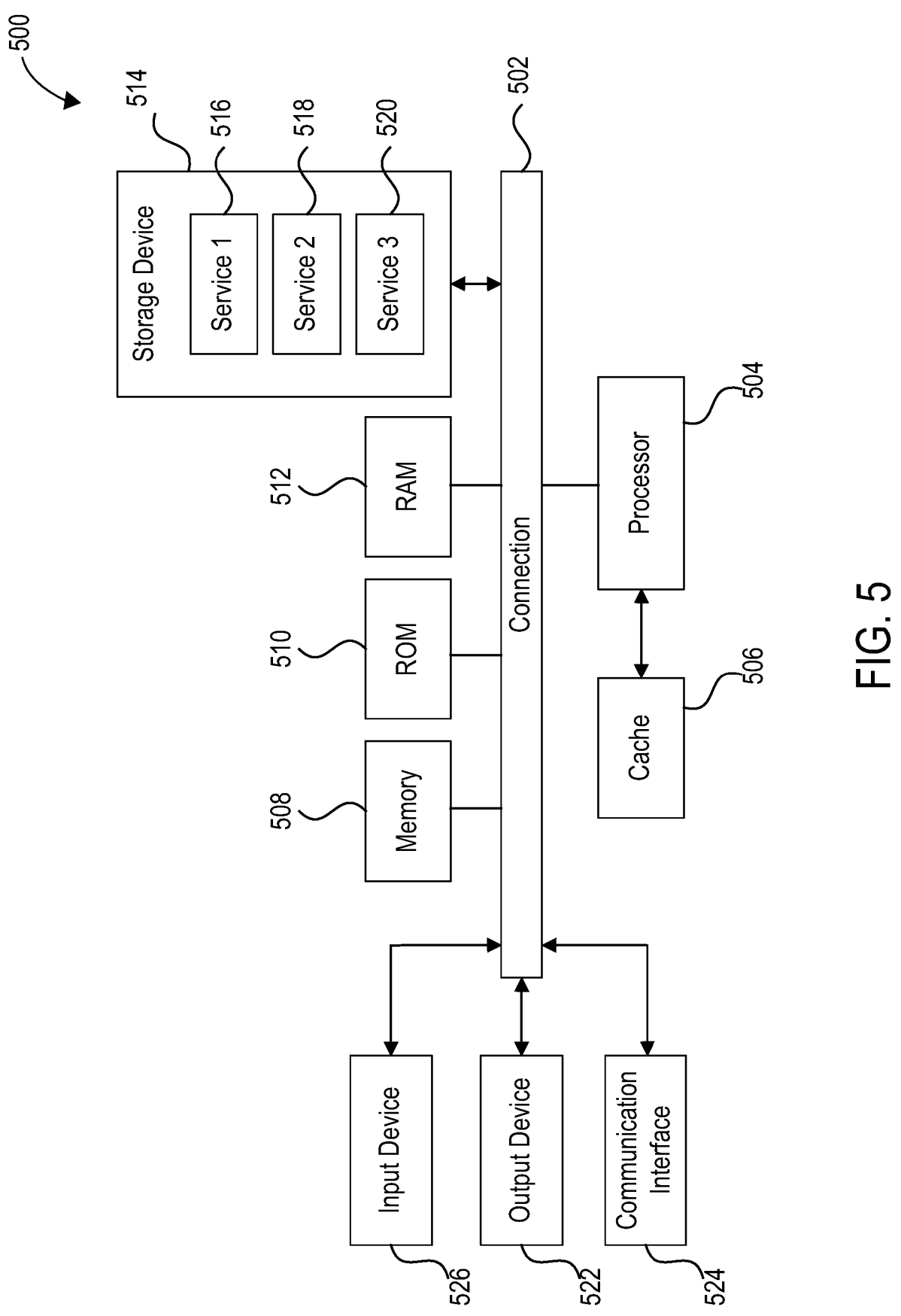
FIG. 5 shows an example of a system for implementing some aspects of the present technology.

FIG. 5 shows an example of computing system 500, which can be for example any computing device making up client application 104, community hosting service 102, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, such as read-only memory (ROM) 510 and random access memory (RAM) 512 to processor 504. Computing system 500 can include a cache of high-speed memory 506 connected directly with, in close proximity to, or integrated as part of processor 504.

Processor 504 can include any general purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A computer-implemented method comprising: pushing a first task message from a first publisher of a server that supports near real-time communications to a first topic of an asynchronous messaging server, wherein the first topic includes a message queue and places the first task message in the message queue, and wherein the first task message is pushed to a first subscription when the first task message is dequeued; pushing a second task message from a second publisher to the first topic, wherein the first publisher and the second publisher have different rollout schedules; receiving the first task message at a subscriber worker associated with the first publisher; and setting a delay mechanism before performing a task described in the first task message.

Aspect 2. The computer-implemented method of Aspect 1, further comprising: pushing a third task message from a third publisher of the server that supports near real-time communications to a second topic of the asynchronous messaging server, and wherein the second topic pushes the third task message to a third subscription, and wherein the second topic is associated with latency sensitive tasks; receiving the third task message at a third subscriber worker associated with the third publisher; and performing a task described in the third task message.

Aspect 3. The computer-implemented method of Aspects 1 to 2, wherein the task is embedding an image associated with a URL in a message.

Aspect 4. The computer-implemented method of Aspects 1 to 3, further comprising: receiving a request to create a new topic at the asynchronous messaging server, wherein the new topic is associated with a project with tasks to be performed at the server that supports near real-time communications; and sending the request to the asynchronous messaging server.

Aspect 5. The computer-implemented method of Aspects 1 to 4, further comprising: selecting an exactly-once semantic for the new topic.

Aspect 6. The computer-implemented method of Aspects 1 to 5, further comprising: receiving a request to generate a logical workflow associated with the task, wherein the logical workflow includes subtasks that are triggered by the task.

Aspect 7. The computer-implemented method of Aspects 1 to 6, further comprising: setting a guard associated with the first publisher, wherein the guard limits a percentage of times that tasks sent from the first publisher are sent to the asynchronous messaging server, wherein the first task message is not limited by the guard.

Aspect 8. A system comprising: memory configured to store instructions; one or more processors configured to execute the instructions and cause the one or more processors to: push a first task message from a first publisher of a server that supports near real-time communications to a first topic of an asynchronous messaging server, wherein the first topic includes a message queue and places the first task message in the message queue, and wherein the first task message is pushed to a first subscription when the first task message is dequeued; push a second task message from a second publisher to the first topic, wherein the first publisher and the second publisher have different rollout schedules; receive the first task message at a subscriber worker associated with the first publisher; and set a delay mechanism before performing a task described in the first task message.

Aspect 9. The system of Aspect 8, wherein the one or more processors is configured to execute the instructions and cause the one or more processors to: push a third task message from a third publisher of the server that supports near real-time communications to a second topic of the asynchronous messaging server, and wherein the second topic pushes the third task message to a third subscription, and wherein the second topic is associated with latency sensitive tasks; receive the third task message at a third subscriber worker associated with the third publisher; and perform a task described in the third task message.

Aspect 10. The system of Aspects 8 to 9, wherein the task is embedding an image associated with a URL in a message.

Aspect 11. The system of Aspects 8 to 10, wherein the one or more processors is configured to execute the instructions and cause the one or more processors to: receive a request to create a new topic at the asynchronous messaging server, wherein the new topic is associated with a project with tasks to be performed at the server that supports near real-time communications; and send the request to the asynchronous messaging server.

Aspect 12. The system of Aspects 8 to 11, wherein the one or more processors is configured to execute the instructions and cause the one or more processors to: select an exactly-once semantic for the new topic.

Aspect 13. The system of Aspects 8 to 12, wherein the one or more processors is configured to execute the instructions and cause the one or more processors to: receive a request to generate a logical workflow associated with the task, wherein the logical workflow includes subtasks that are triggered by the task.

Aspect 14. The system of Aspects 8 to 13, wherein the one or more processors is configured to execute the instructions and cause the one or more processors to: set a guard associated with the first publisher, wherein the guard limits a percentage of times that tasks sent from the first publisher are sent to the asynchronous messaging server, wherein the first task message is not limited by the guard.

Aspect 15. A non-transitory computer readable medium comprising instructions, the instructions, when executed by a computing system, cause the computing system to: push a first task message from a first publisher of a server that supports near real-time communications to a first topic of an asynchronous messaging server, wherein the first topic includes a message queue and places the first task message in the message queue, and wherein the first task message is pushed to a first subscription when the first task message is dequeued; push a second task message from a second publisher to the first topic, wherein the first publisher and the second publisher have different rollout schedules; receive the first task message at a subscriber worker associated with the first publisher; and set a delay mechanism before performing a task described in the first task message.

Aspect 16. The computer readable medium of Aspect 15, wherein the computer readable medium further comprises instructions that, when executed by the computing system, cause the computing system to: push a third task message from a third publisher of the server that supports near real-time communications to a second topic of the asynchronous messaging server, and wherein the second topic pushes the third task message to a third subscription, and wherein the second topic is associated with latency sensitive tasks; receive the third task message at a third subscriber worker associated with the third publisher; and perform a task described in the third task message.

Aspect 17. The computer readable medium of Aspect 16, the task is embedding an image associated with a URL in a message.

Aspect 18. The computer readable medium of Aspects 16 to 17, wherein the computer readable medium further comprises instructions that, when executed by the computing system, cause the computing system to: receive a request to create a new topic at the asynchronous messaging server, wherein the new topic is associated with a project with tasks to be performed at the server that supports near real-time communications; and send the request to the asynchronous messaging server.

Aspect 19. The computer readable medium of Aspects 16 to 18, wherein the computer readable medium further comprises instructions that, when executed by the computing system, cause the computing system to: select an exactly-once semantic for the new topic.

Aspect 20. The computer readable medium of Aspects 16 to 19, wherein the computer readable medium further comprises instructions that, when executed by the computing system, cause the computing system to: receive a request to generate a logical workflow associated with the task, wherein the logical workflow includes subtasks that are triggered by the task.

What is claimed is:

1. A computer-implemented method comprising:
pushing a first task message from a first publisher of a server that supports near real-time communications to a first topic of an asynchronous messaging server, wherein the first topic includes a message queue and places the first task message in the message queue, and wherein the first task message is pushed to a first subscription when the first task message is dequeued;
pushing a second task message from a second publisher to the first topic, wherein the first publisher and the second publisher have different rollout schedules based on respective executable tasks codes of each publisher;
receiving the first task message at a subscriber worker associated with the first publisher, wherein the first task message includes an executable task code;
determining the executable task code is associated with instructions for a delay mechanism; and
setting the delay mechanism by the subscriber worker based on respective executable task code before performing a task described in the first task message.

2. The computer-implemented method of claim 1, further comprising:
pushing a third task message from a third publisher of the server that supports near real-time communications to a second topic of the asynchronous messaging server, and wherein the second topic pushes the third task message to a third subscription, and wherein the second topic is associated with latency sensitive tasks;
receiving the third task message at a third subscriber worker associated with the third publisher; and
performing a task described in the third task message.

3. The computer-implemented method of claim 2, wherein the task is embedding an image associated with a URL in a message.

4. The computer-implemented method of claim 1, further comprising:
receiving a request to create a new topic at the asynchronous messaging server, wherein the new topic is associated with a project with tasks to be performed at the server that supports near real-time communications; and
sending the request to the asynchronous messaging server.

5. The computer-implemented method of claim 4, further comprising:
selecting an exactly-once semantic for the new topic.

6. The computer-implemented method of claim 1, further comprising:
receiving a request to generate a logical workflow associated with the task, wherein the logical workflow includes subtasks that are triggered by the task.

7. The computer-implemented method of claim 1, further comprising:
setting a guard associated with the first publisher, wherein the guard limits a percentage of times that tasks sent from the first publisher are sent to the asynchronous messaging server, wherein the first task message is not limited by the guard.

8. A system comprising:
memory configured to store instructions;
one or more processors configured to execute the instructions and cause the one or more processors to:
push a first task message from a first publisher of a server that supports near real-time communications to a first topic of an asynchronous messaging server, wherein the first topic includes a message queue and places the first task message in the message queue, and wherein the first task message is pushed to a first subscription when the first task message is dequeued;
push a second task message from a second publisher to the first topic, wherein the first publisher and the second publisher have different rollout schedules based on respective executable tasks codes of each publisher;
receive the first task message at a subscriber worker associated with the first publisher, wherein the first task message includes an executable task code;
determine the executable task code is associated with instructions for a delay mechanism; and
set the delay mechanism by the subscriber worker based on respective executable task code before performing a task described in the first task message.

9. The system of claim 8, wherein the one or more processors is configured to execute the instructions and cause the one or more processors to:
push a third task message from a third publisher of the server that supports near real-time communications to a second topic of the asynchronous messaging server, and wherein the second topic pushes the third task message to a third subscription, and wherein the second topic is associated with latency sensitive tasks;

receive the third task message at a third subscriber worker associated with the third publisher; and perform a task described in the third task message.

10. The system of claim 9, wherein the task is embedding an image associated with a URL in a message.

11. The system of claim 8, wherein the one or more processors is configured to execute the instructions and cause the one or more processors to:

receive a request to create a new topic at the asynchronous messaging server, wherein the new topic is associated with a project with tasks to be performed at the server that supports near real-time communications; and send the request to the asynchronous messaging server.

12. The system of claim 11, wherein the one or more processors is configured to execute the instructions and cause the one or more processors to:

select an exactly-once semantic for the new topic.

13. The system of claim 8, wherein the one or more processors is configured to execute the instructions and cause the one or more processors to:

receive a request to generate a logical workflow associated with the task, wherein the logical workflow includes subtasks that are triggered by the task.

14. The system of claim 8, wherein the one or more processors is configured to execute the instructions and cause the one or more processors to:

set a guard associated with the first publisher, wherein the guard limits a percentage of times that tasks sent from the first publisher are sent to the asynchronous messaging server, wherein the first task message is not limited by the guard.

15. A non-transitory computer readable medium comprising instructions, the instructions, when executed by a computing system, cause the computing system to:

push a first task message from a first publisher of a server that supports near real-time communications to a first topic of an asynchronous messaging server, wherein the first topic includes a message queue and places the first task message in the message queue, and wherein the first task message is pushed to a first subscription when the first task message is dequeued;

push a second task message from a second publisher to the first topic, wherein the first publisher and the second publisher have different rollout schedules based on respective executable tasks codes of each publisher;

receive the first task message at a subscriber worker associated with the first publisher, wherein the first task message includes an executable task code;

determine the executable task code is associated with instructions for a delay mechanism; and set the delay mechanism by the subscriber worker based on respective executable task code before performing a task described in the first task message.

16. The non-transitory computer readable medium of claim 15, wherein the computer readable medium further comprises instructions that, when executed by the computing system, cause the computing system to:

push a third task message from a third publisher of the server that supports near real-time communications to a second topic of the asynchronous messaging server, and wherein the second topic pushes the third task message to a third subscription, and wherein the second topic is associated with latency sensitive tasks;

receive the third task message at a third subscriber worker associated with the third publisher; and perform a task described in the third task message.

17. The non-transitory computer readable medium of claim 16, the task is embedding an image associated with a URL in a message.

18. The non-transitory computer readable medium of claim 15, wherein the computer readable medium further comprises instructions that, when executed by the computing system, cause the computing system to:

receive a request to create a new topic at the asynchronous messaging server, wherein the new topic is associated with a project with tasks to be performed at the server that supports near real-time communications; and send the request to the asynchronous messaging server.

19. The non-transitory computer readable medium of claim 18, wherein the computer readable medium further comprises instructions that, when executed by the computing system, cause the computing system to:

select an exactly-once semantic for the new topic.

20. The non-transitory computer readable medium of claim 15, wherein the computer readable medium further comprises instructions that, when executed by the computing system, cause the computing system to:

receive a request to generate a logical workflow associated with the task, wherein the logical workflow includes subtasks that are triggered by the task.

* * * * *